Aug. 24, 1965    B. E. BALTHAZOR    3,201,897
SIMULATED FLAT TIRED VEHICLE
Original Filed May 8, 1961    2 Sheets-Sheet 1
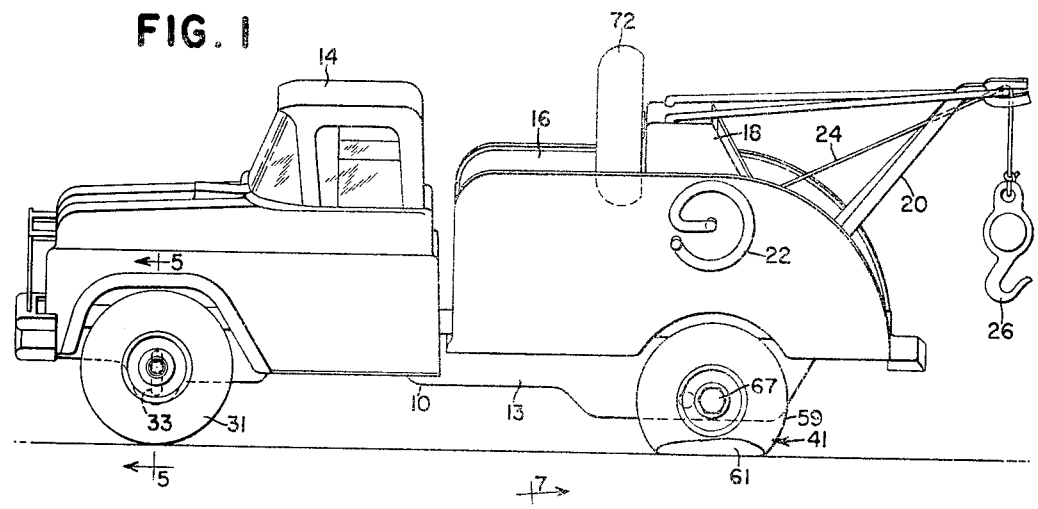
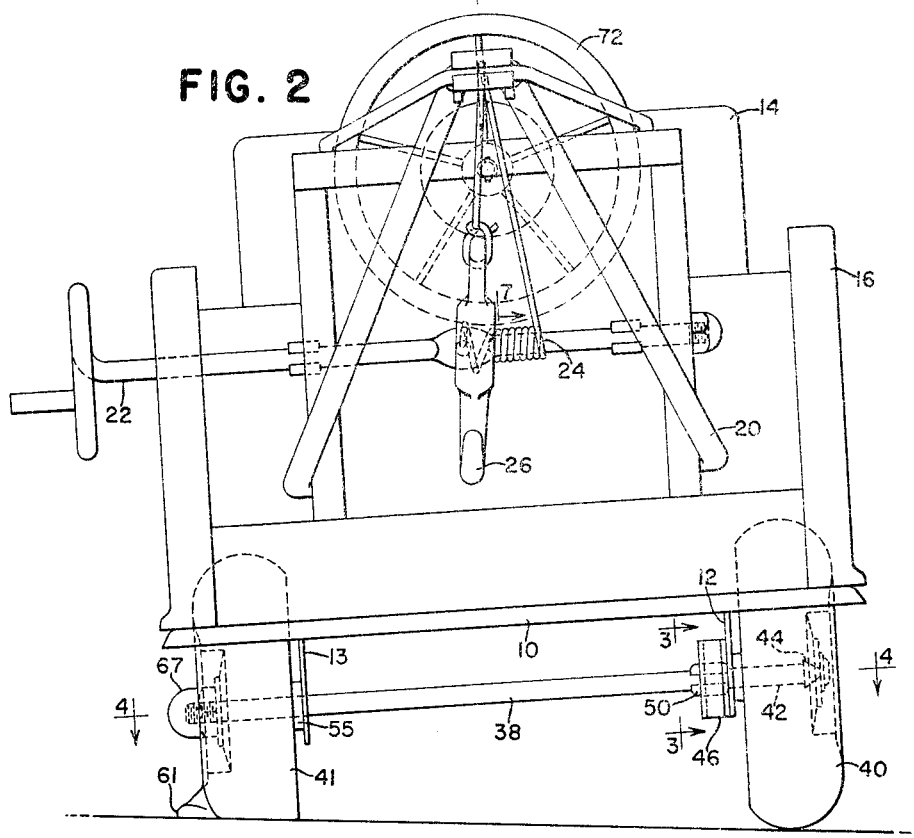
INVENTOR.
B. E. BALTHAZOR
BY
ATTORNEY Aug. 24, 1965   B. E. BALTHAZOR   3,201,897
SIMULATED FLAT TIRED VEHICLE
Original Filed May 8, 1961   2 Sheets-Sheet 2
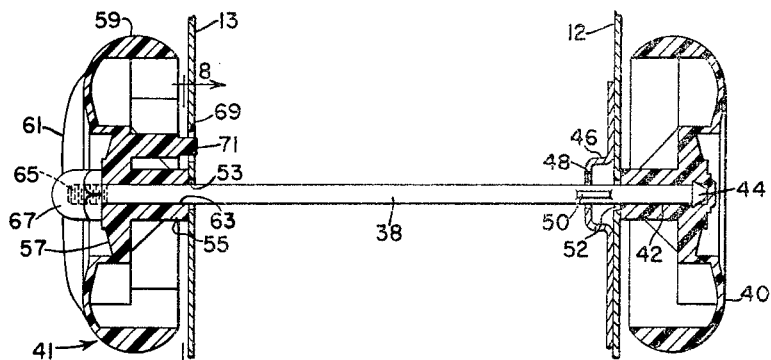
FIG. 4
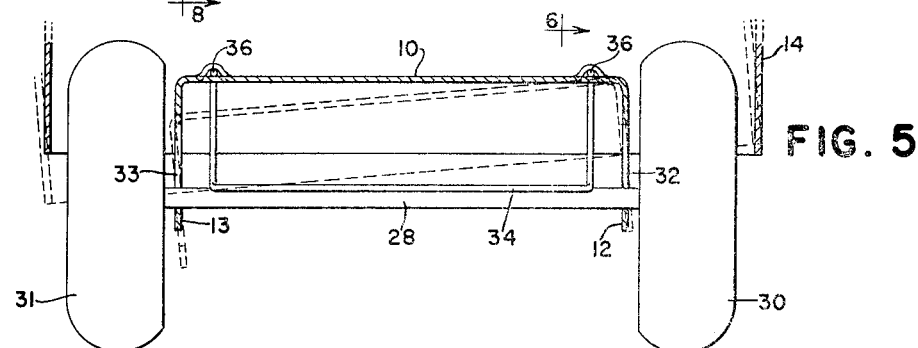
FIG. 5
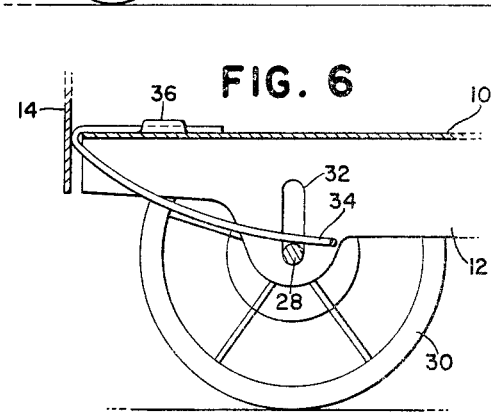
FIG. 6
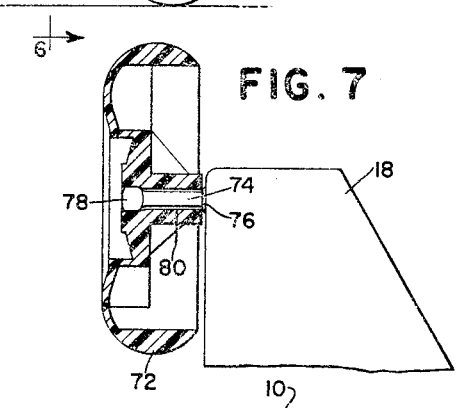
FIG. 7
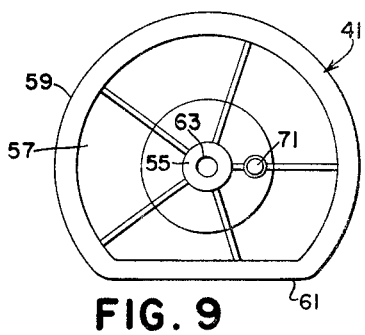
FIG. 9
FIG. 8
INVENTOR.
B. E. BALTHAZOR
BY
ATTORNEY

United States Patent Office 3,201,897
Patented Aug. 24, 1965

3,201,897
SIMULATED FLAT TIRED VEHICLE
Bernard E. Balthazor, Moline, Ill., assignor to Buddy L Corporation, East Moline, Ill., a corporation of Delaware
Continuation of application Ser. No. 108,387, May 8, 1961. This application Apr. 15, 1963, Ser. No. 274,379
6 Claims. (Cl. 46—202)

The present application is a continuation of copending application 108,387, filed May 8, 1961, now abandoned.

This invention relates to a toy in the form of a simulated small-size vehicle and more particularly to novel improvements in such vehicle in which one of the components of the toy is designed to simulate damage thereto and is interchangeable with an undamaged component.

The invention finds particular utility in a small-size model of an actual vehicle such as a motor truck, passenger car or the like having four wheels and a spare wheel, one of which is shaped or formed to simulate damage. In the particular case, the damaged wheel has a flat tire. This wheel is made removable and is replaceable with a normal spare wheel. Experience gained through the manufacture and sale of toys of this character has shown that small children readily appreciate the novelty, which increases their enjoyment of the toy. It is a further object of the invention to provide the wheel arrangement in such manner that when the flat-tired wheel is installed, its flat portion will always be lowermost. A further object of the invention is to provide the wheel with a wheel and axle connection which is removable or separable, and to provide a removable spare wheel mount with which the normal and flat-tired wheel interchangeably cooperate. In connection with the mounting and dismounting of the wheels on the axle, it is a feature to provide means for locking the axle against rotation so that a threaded fastener may be employed as means for removably securing the wheel to the axle. A still further object resides in the provision of a four-wheeled vehicle in which the axle at the end opposite from the interchangeable wheels simulates individual wheel suspension whereby when the flat-tired wheel is installed on the rear axle, for example, the vehicle will tilt to that side and thus still further increase the simulation of a vehicle having a flat tire. It is a further object to provide a flat-tired wheel of the character and for the purposes described.

The foregoing and other important objects and desirable features inherent in and encompassed by the invention will become apparent as a preferred embodiment thereof is disclosed in detail in the ensuing description and accompanying sheets of drawings, the figures of which are described below.

FIGURE 1 is a side elevation of a simulated vehicle in which the left rear tire is "flat."

FIGURE 2 is an enlarged rear view of the same.

FIGURE 3 is a fragmentary section on the line 3—3 of FIGURE 2.

FIGURE 4 is a section on the line 4—4 of FIGURE 2.

FIGURE 5 is an enlarged section on the line 5—5 of FIGURE 1.

FIGURE 6 is a section on the line 6—6 of FIGURE 5.

FIGURE 7 is a fragmentary section on the line 7—7 of FIGURE 2.

FIGURE 8 is a section on the line 8—8 of FIGURE 4.

FIGURE 9 is an inside elevational view of the flat-tired wheel by itself.

The vehicle chosen for purposes of illustration is a simulated wrecker truck preferably constructed largely of a relatively heavy gauge sheet metal. The vehicle has a longitudinal or fore-and-aft body 10 which includes right and left hand side sills 12 and 13, a forward portion including a combined fender, hood and cab unit 14 and a rear body portion 16 which in this case is equipped with a support 18 and a wrecker crane 20 provided with a simulated winch 22, cable 24 and lift hook 26. The expressions "right" and "left" are used with reference to the position of an observer standing behind the vehicle and facing forwardly.

The front end of the body is carried on a transverse front axle 28 and right and left hand front wheels 30 and 31, respectively, via mounting means which simulates individual wheel suspension, the basic principle of which is covered in co-pending application Serial No. 87,376 filed February 6, 1961, now Patent No. 3,083,499. In the present case, the suspension involves the provision respectively in the side sills 12 and 13 of vertically elongated slots 32 and 33 through which the axle 28 extends and in which the axle is capable of vertical movement within limits, opposed by a spring 34 which is in the form of a U having opposite terminal ends secured in any suitable manner as at 36 to a portion of the body 10 ahead of the axle 28. The legs and bight portion of the U rest on the axle 28 and normally keep the axle to the lower ends of the respective slots, as shown in FIGURE 6. The spring is made of suitable spring wire and is capable of being deflected by pressure at either side or centrally of the forward portion of the truck.

The rear end of the vehicle is carried on a transverse rear axle 38 and right and left hand wheels 40 and 41, the latter in this case being shaped to simulate a flat-tired wheel; although, any other simulated damaged component could be employed on the basis of the present suggestion. The wheel 40 has a central aperture 42 therein and the right hand end of the axle is headed as shown at 44 in FIGURE 2 to provide a snap-in, snap-out connection, which is sufficient to retain the wheel on the axle and yet allows the wheel to rotate relative to the axle, since the axle is keyed against rotation by the provision on the inside of the right hand side sill 12 of a box-like bracket 46 which has therein a double-key hole slot 48 which receives a pinched or upset portion 50 of the axle. As best shown in FIGURE 4, the side sill 12 has an aperture 52 therein which additionally receives the axle to afford a suitable support between the axle and the body at the right side of the vehicle. The other side sill 13 has therein an aperture 53 which is coaxial with the apertures 48 and 52 and which receives the left hand portion of the axle 28.

The wheel 41 is of special configuration, having a hub 55, a wheel body 57 and a peripheral simulated tire 59, a portion of which is deliberately deformed in its design to simulate a "flat," this portion being shown at 61. The hub 55 has a central bore 63 therethrough which loosely receives the left hand end of the axle 38, which end is externally threaded at 65 (FIGURE 4) to receive a removable fastener, here in the form of an acorn nut 67.

From the description thus far, it will be seen that when the vehicle is equipped with the flat tire 41, it will assume a leaning position which of course simulates the position occupied by an actual vehicle when its left rear tire is flat. The dotted line illustration in FIGURE 5 shows how the front suspension accommodates the leaning or tilting of the vehicle. At this point, one of the features of the invention will become apparent by reference to the fact that it is desirable, of course, to have the wheel 41 installed with its flat portion 61 lowermost so that it engages the ground. For this purpose, the left hand side sill has therein an aperture 69 just ahead of the axle aperture 53 (FIGURE 8) and this, in conjunction with an inwardly projecting eccentric lug 71 on the inner face of the wheel 41, affords key means insuring installation of the wheel 41 in only one position; that is, with its flat portion 61 lowermost. The purpose of the key means at the right hand side of the vehicle (at 46-50) is to hold the axle against rotation so as to facilitate installation and removal of the acorn nut 67. The "reality" of the situation may further be proved or carried out by providing the vehicle with a set of miniature tools for the purpose of facilitating removal and installation of the wheel 41, particularly in conjunction with the interchange thereof with a spare wheel 72, which is a normal or perfectly circular wheel removably carried by the derrick or crane support 18 by means of a forwardly projecting pin 74 which may be welded at 76 to the support 18. The forward end of the pin or stud 74 is enlarged or upset at 78 to provide a snap-on connection between the pin and the bore 80 through the hub of the wheel 72. Except for the "flat" 61 on the wheel 41, and further except for the lug or projection 71, also on the wheel 41, the wheels 41 and 72 may be made identical.

In the commercial embodiment of the vehicle, the wheels are formed of any suitable molded plastic which lends itself readily to the particular configuration of the wheels shown, especially the formation of the flat 61 on the wheel 41. As already indicated, however, other materials and variations could be employed.

On the same basis, features and advantages in addition to those enumerated will readily occur to those versed in the art, all without departure from the spirit and scope of the appended claims.

What is claimed is:

1. A toy in the form of a simulated vehicle having a body including wheel-mounting portions, a plurality of simulated pneumatic-tired wheels carrying the body, a simulated pneumatic-tired spare wheel carried by the body, one of the wheels of said plurality of wheels and said spare wheel being removable from the body and interchangeable with each other, and one of said last-mentioned two wheels being formed to simulate a flat tire having a flat ground-engaging portion, and said flat-tired wheel having means cooperative with a portion of the body, when installed as one of the wheels carrying the body, for preventing rotation of said flat-tired wheel, said means being so related to said flat portion as to insure installation of said flat-tired wheel with said flat portion lowermost.

2. A toy in the form of a simulated vehicle having a body including wheel-mounting portions, a plurality of wheels carrying the body, a spare wheel carried by the body, one of the wheels of said plurality of wheels and said spare wheel being removable from the body and interchangeable with each other, and one of said last-mentioned two wheels being formed to simulate a damaged wheel having a damaged portion adapted to be disposed in a predetermined angular position when interchange with said one wheel, and said damaged wheel having means cooperative with a portion of the body, when installed as one of the wheels carrying the body, for preventing rotation of said damaged wheel, said means being so related to said damaged portion as to insure installation of said damaged wheel with said damaged portion in said predetermined position.

3. A toy in the form of a simulated vehicle having a body including wheel-mounting portions, and a plurality of simulated pneumatic-tired wheels carrying the body, one of said wheels being formed to simulate a flat tire having a flat ground-engaging portion, and said flat-tired wheel having means cooperative with a portion of the body for preventing rotation of said flat-tired wheel, said means being so related to said flat portion as to insure installation of said flat-tired wheel with said flat portion lowermost.

4. A toy in the form of a simulated vehicle having a body including front and rear ends, front and rear transverse axles respectively at said front and rear ends, vertical guide and lost-motion means connecting one of the axles to the body at its associated end to enable said one axle to rise and fall bodily as well as at either end relative to the body, a pair of front and a pair of rear simulated pneumatic-tired wheels carried respectively by the axles to support the body, a similar simulated pneumatic-tired spare wheel carried by the body, said spare wheel and at least one wheel of at least one of said pairs being removable from the body and interchangeable with each other, and one of said last-mentioned two wheels being formed to simulate a flat tire having a flat ground-engaging portion, said guide and lost-motion means accommodating listing of the body when the flat-tired wheel is installed on said one axle with its flat portion lowermost, said flat-tired wheel having means cooperative with the body, when installed as one of the wheels carrying the body, for preventing rotation of said flat-tired wheel and so related to said flat portion as to insure installation of said flat-tired wheel with said flat portion lowermost.

5. A toy in the form of a simulated vehicle having a body, an axle carried by the body and including a terminal end, means cooperative between the body and the axle and preventing rotation of the latter, a plurality of simulated pneumatic-tired wheels carrying the body, one of said wheels being mounted on said axle end, releasable securing means removably connected to said axle and for removably retaining said one wheel, a spare simulated pneumatic-tired wheel removably carried by the body and interchangeable with said one wheel, and one of said last-mentioned two wheels being formed to simulate a flat tire having a flat ground-engaging portion, said flat-tired wheel having means for preventing rotation thereof, when installed on said axle with said flat portion lowermost whereby to keep said flat portion lowermost.

6. A toy in the form of a simulated vehicle having a body, an axle carried by the body and including a threaded terminal end, means cooperative between the body and the axle for preventing rotation of the latter, a plurality of simulated pneumatic-tired wheels carrying the body, one of said wheels being mounted on said axle, threaded securing means threaded on said axle end for removably retaining said one wheel, a spare simulated pneumatic-tired wheel removably carried by the body and interchangeable with said one wheel, and one of said last-mentioned two wheels being formed to simulate a flat tire having a flat ground-engaging portion, said flat-tired wheel having means cooperative with the body, when mounted on the axle, for preventing rotation of said flat-tired wheel and so related to said flat portion as to insure installation of said flat-tired wheel with said flat portion lowermost.

References Cited by the Examiner

UNITED STATES PATENTS

| | | | |
|---|---|---|---|
| 1,578,592 | 3/26 | Florkey | 46—222 |
| 2,587,142 | 2/52 | Gray et al. | 46—221 X |
| 3,009,287 | 11/61 | Davis | 46—222 |

RICHARD C. PINKHAM, *Primary Examiner.*